W. H. CARRIER.
PSYCHROMETER.
APPLICATION FILED DEC. 5, 1908. RENEWED FEB. 26, 1913.

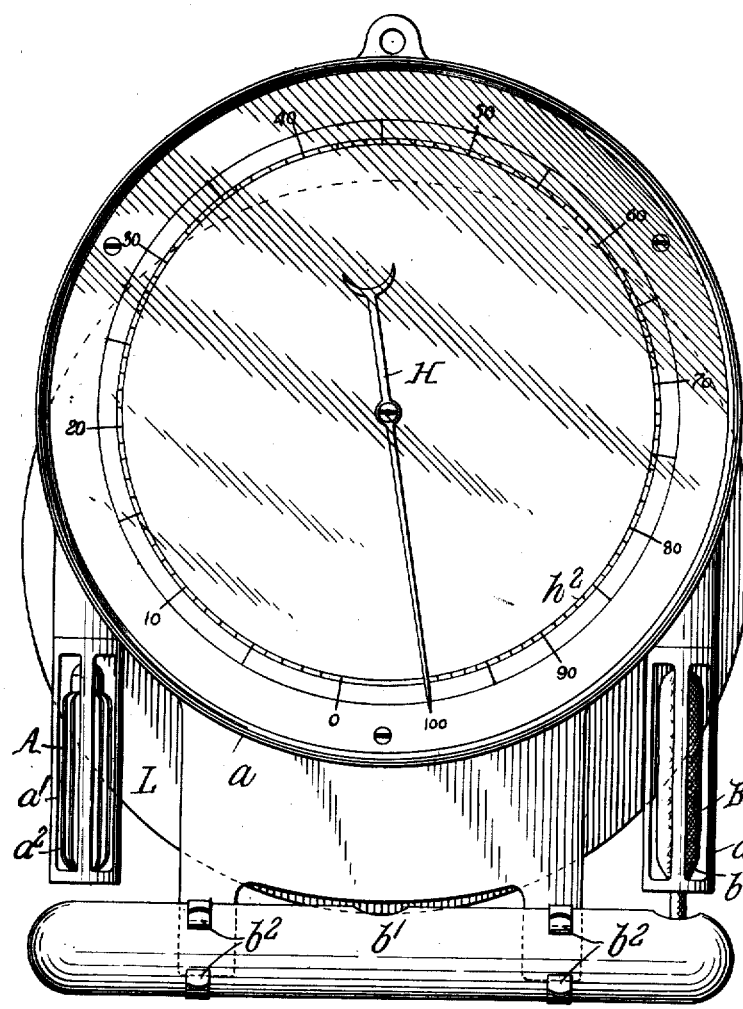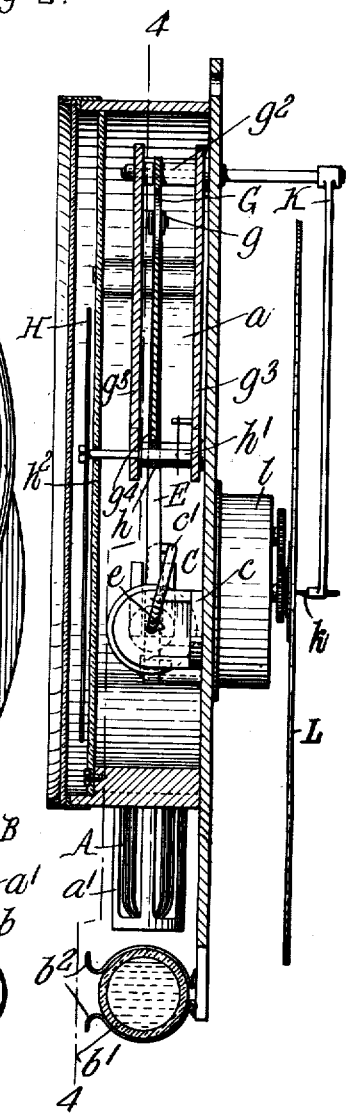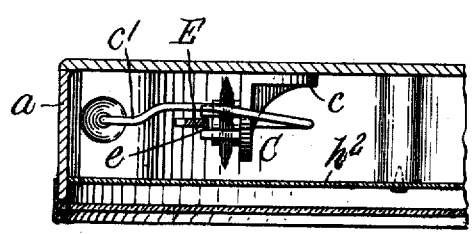

1,165,225.

Patented Dec. 21, 1915.
2 SHEETS—SHEET 2.

Witnesses:
A. G. Dimond
E. A. Volk

Inventor
Willis H. Carrier
by
Wilhelm Parker & Hand
Attorneys.

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

PSYCHROMETER.

1,165,225. Specification of Letters Patent. Patented Dec. 21, 1915.

Application filed December 5, 1908, Serial No. 466,113. Renewed February 26, 1913. Serial No. 750,934.

*To all whom it may concern:*

Be it known that I, WILLIS H. CARRIER, a citizen of the United States, residing at Buffalo, in the county of Erie and State of New York, have invented a new and useful Improvement in Psychrometers, of which the following is a specification.

This invention relates more particularly to instruments for indicating and recording the hygrometric condition of air in textile mills and other places where it is necessary or desirable to know or keep a record of such conditions.

The primary object of the invention is to produce an efficient and reliable instrument of simple and practical construction which will accurately indicate, and record also, if desired, the hygrometric conditions of the air throughout a wide range of temperature changes.

Other objects of the invention are to provide an instrument of the character stated in which the differential pressures of the vapor generated by bodies of a volatile liquid influenced respectively by the wet and dry bulb temperatures of the air are made use of to operate the indicating and recording devices; and also to improve psychrometers in the respects hereinafter described and set forth in the claims.

The instrument comprises two generators or receptacles which are subjected respectively to the dry and wet bulb temperatures of the air and contain a volatile liquid, the differential pressures of the vapor produced by which act in opposition through suitable instrumentalities to move an indicating device or device whose position is thus dependent upon the hygrometric condition of the air. Sulfur dioxid is particularly adapted for use in this type of instrument because of the peculiar temperature pressure properties of its vapor. The ratio of the vapor pressures (above atmospheric) of sulfur dioxid corresponding to wet and dry bulb temperatures is substantially constant at any per cent. of humidity throughout a wide range of dry bulb temperatures, say, for example, between the temperatures of 60° and 100° F. Furthermore, this ratio changes practically uniformly for each per cent. of variation in relative humidity. Any other simple or compound volatile liquid which has a similar vapor pressure temperature relation could, however, be employed.

Figure 4:
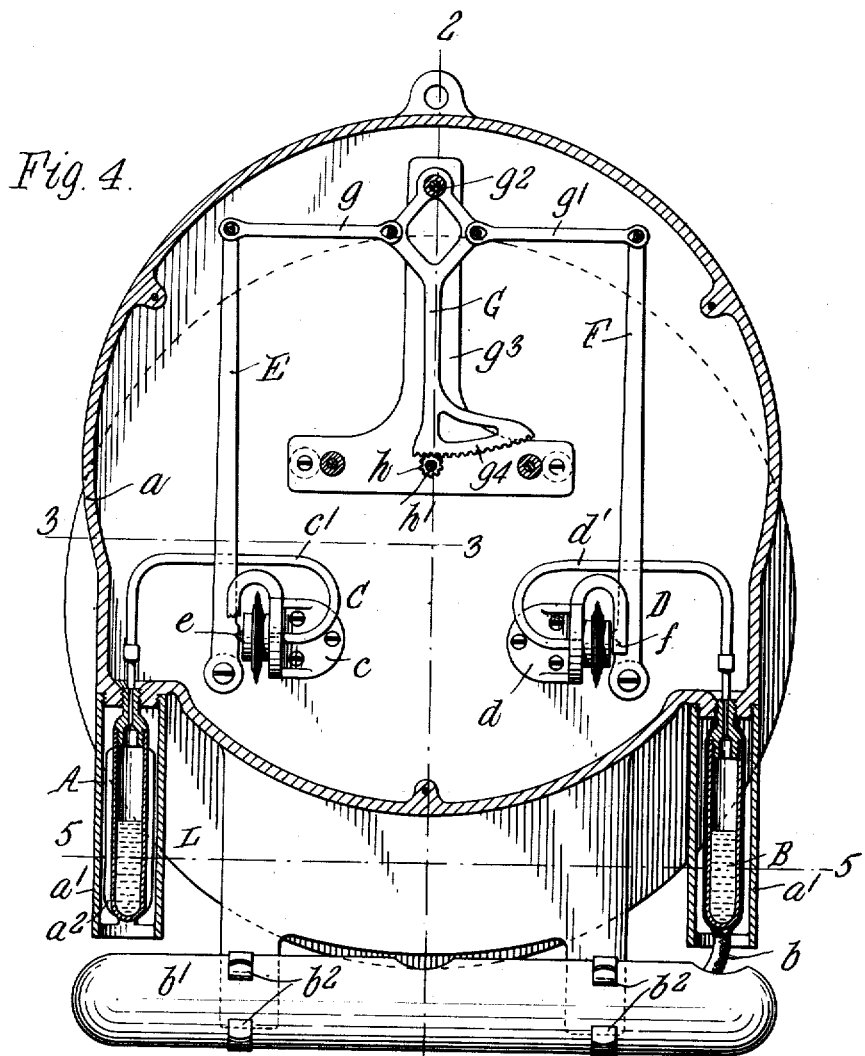
Figure 5:
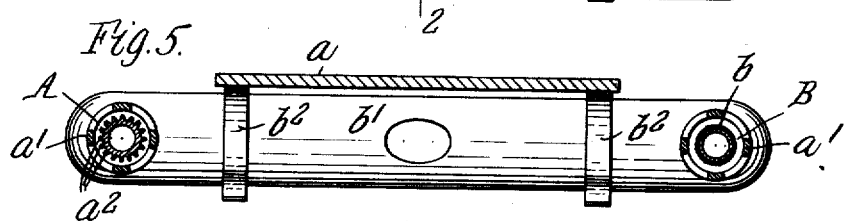
Figure 6:
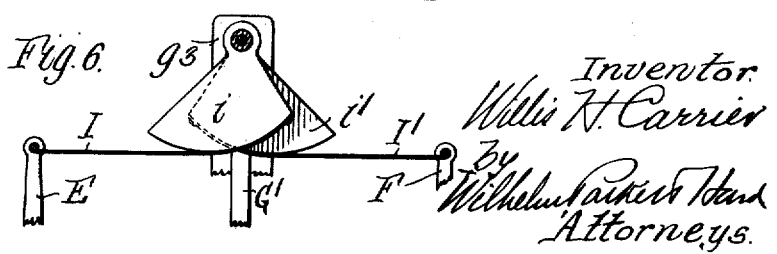

In the accompanying drawings, consisting of two sheets: Figure 1 is a front elevation of an indicating and recording psychrometer embodying the invention. Fig. 2 is a transverse sectional elevation thereof in line 2—2, Fig. 4. Fig. 3 is a fragmentary sectional plan view thereof in line 3—3, Fig. 4. Fig. 4 is a longitudinal sectional elevation thereof in line 4—4, Fig. 2. Fig. 5 is a sectional plan view thereof in line 5—5, Fig. 4. Fig. 6 is a fragmentary elevation of a modified construction of the operating mechanism for the indicator.

Like letters of reference refer to like parts in the several figures.

The instrument shown in the drawings is provided with means for both indicating and recording humidities, but either may be used alone.

A and B represent two generator tubes or receptacles, each partially filled with a volatile liquid, such, for instance, as sulfur dioxid, which has the characteristic before stated. One generator, A, is exposed to the actual, or dry-bulb, temperature of the air, while means are provided for enveloping the other generator, B, with evaporating moisture for causing the temperature of this generator to correspond to that of the wet bulb thermometer. The generators A and B are connected to devices or motors C and D which are respectively actuated by the different vapor pressures produced by the generators, and operate in opposition on the indicating or recording device through suitable connecting mechanism.

In the construction shown in the drawings, the generator receptacles are arranged at the opposite sides of and depend from a circular casing $a$ and are surrounded by protecting cages $a'$ attached to the casing $a$. The generator A is preferably corrugated or ribbed, as shown at $a^2$ in Fig. 5, for enlarging its radiating surface to render it more readily responsive to temperature changes. The other generator, B, is covered by a wick $b$ which is kept wet by dipping into water in a reservoir $b'$ held by clips $b^2$ secured to a depending portion of the back plate of the casing $a$. The generators can be constructed and mounted in any other suitable way and any other suitable means can be employed for causing the temperature of the generator B to correspond to that of the wet bulb thermometer.

The motors C and D are mounted on suitable brackets $c$ and $d$ in the casing $a$ and are connected to the generators A and B respectively by pipes or tubes $c'$ and $d'$. The movable diaphragms of the motors have knife edges $e$ and $f$ which bear against levers E and F which are pivoted in any suitable manner at their lower ends in the casing $a$ and are connected at their upper ends by links $g$ $g'$ to diverging parts of a lever G which is secured to a shaft or pivot $g^2$ journaled in a frame $g^3$ in the casing and is provided at its free end with a toothed segment $g^4$ which meshes with a pinion $h$ on a shaft $h'$ which is journaled in the frame $g^3$. This shaft $h'$ projects through a dial or front plate $h^2$ of the casing $a$ and is provided at its front end with a pointer or index H which is caused to travel around the dial of the movement of the segment lever and coöperates with the graduations on the dial to indicate the humidity of the air.

The dry and wet bulb temperatures are equal only when the air has a humidity of one hundred per cent., or is saturated, so that the vapor pressures in the two motors C and D are equal only when there is a humidity of one hundred per cent., and the difference between these pressures increases as the humidity decreases. Consequently the pressure-actuated mechanism between the generators and the indicating device should be constructed so that the pressure from the dry bulb generator A will act on the indicator with a decreasing leverage, while the pressure from the wet bulb generator B will act with an increasing leverage during a decrease in the humidity, and vice versa during an increase in the humidity. This is accomplished in the described mechanism by connecting the links $g$ $g'$ with the segment lever at points located at corresponding distances to the opposite sides of a line connecting the lever pivot with the axis of the index when the lever is in its neutral position. Any other suitable mechanism which will produce this result can be used. For instance, as shown in Fig. 6, a segment lever G' is employed provided with cam parts $i$ and $i'$ having peripheries which curve in opposite directions on increasing radii, and flexible bands I I' are attached at one end to and pass over the peripheries of these cams and are attached at their other ends to the free ends of the motor levers E and F. As the cams swing, the bands bear on portions thereof at different distances from the axis of the cams so that the leverage of the motor lever E on the segment lever G' decreases while the leverage of the other motor lever F increases.

In the instrument illustrated, the pivot or shaft $g^2$ of the segment lever extends rearwardly through the casing $a$ and has secured to its outer end a recording arm K provided at its free end with a marking device $k$ adapted to make a record on a graduated record disk L which is rotated by suitable clock mechanism $l$. The arm K is shifted relative to the record disk L by the movement of the pressure-actuated segment lever G so that a record is made of the hygrometric conditions. Any suitable recording mechanism can be used, that described being selected simply to indicate that the psychrometer can be used for recording as well as for indicating purposes.

The term "indicating device" is employed in some of the claims in a broader sense than usual to designate either a device which simply indicates or which registers or makes a record, and where appropriate the term will be understood with this broader meaning.

A psychrometer has been described in which the devices operated by the differential pressures produced by the two generators are for the purpose of indicating and recording the hygrometric condition of the air, but it is manifest that the device actuated by the described pressure-operated mechanism could be utilized for some other purpose in which the device is required to act in response to changes in the hygrometric condition of the air.

I claim as my invention:

1. The combination of vapor generators, one of which is influenced by the dry bulb temperature of the air, means whereby the other generator is influenced by the wet bulb temperature of the air, an indicating device, and means actuated by the conjoint action of the different pressures produced by said generators for moving said device, whereby the position of said device is dependent upon the relation existing between the wet and dry bulb temperatures of the air, substantially as set forth.

2. In a psychrometer, the combination of vapor generators, one of which is influenced by the actual temperature of the air, means whereby moisture is evaporated in the vicinity of the other generator, an indicating device, and mechanism upon which the different vapor pressures produced by said generators operate in opposition to move said indicating device, whereby the position of said indicating device is dependent upon the relation existing between the wet and dry bulb temperatures of the air, substantially as set forth.

3. In a psychrometer, the combination of vapor generators, means whereby said generators are independently influenced by different temperatures, an indicating device, and mechanism upon which the different vapor pressures produced by said generators operate conjointly to move said indicating device and which includes means for automatically and inversely changing the leverage with which said different pressures act on said indicating device, substantially as set forth.

4. The combination of vapor generators, one of which is influenced by the dry bulb temperature of the air, means whereby the other generator is influenced by the wet bulb temperature of the air, a device and operating mechanism therefor upon which the different vapor pressures produced by said generators operate conjointly to move said device and which includes means for automatically decreasing the leverage with which the pressure from said dry bulb generator acts on said device and increasing the leverage with which the wet bulb generator acts on said device during a decrease in the humidity of the air, substantially as set forth.

5. The combination of generator receptacles which contain sulfur dioxid and one of which is influenced by the dry bulb temperature of the air, means whereby the other receptacle is influenced by the wet bulb temperature of the air, a movable device, and operating mechanism therefor which is actuated by the conjoint action of the different vapor pressures produced from the sulfur dioxid in said receptacles, substantially as set forth.

6. In a psychrometer, the combination of vapor generators one of which is influenced by the dry bulb temperature of the air, means whereby the other generator is influenced by the wet bulb temperature of the air, an indicating device, motors actuated by the different vapor pressures produced by said generators, and a leverage changing mechanism connecting said motors to said indicating device, substantially as set forth.

7. In a psychrometer, the combination of vapor generators one of which is influenced by the dry bulb temperature of the air, means whereby the other generator is influenced by the wet bulb temperature of the air, indicating and recording devices, and mechanism actuated by the conjoint action of the different vapor pressures produced by said generators for moving said indicating and recording devices, whereby the positions of said devices are dependent upon the relation existing between the wet and dry bulb temperatures of the air, substantially as set forth.

8. The combination of two receptacles each partially filled with a volatile liquid which produces vapor pressure at ordinary atmospheric temperatures, one of said receptacles being influenced by the dry bulb temperature of the air, means whereby the other receptacle is influenced by the wet bulb temperature of the air, a movable device, and means actuated by the conjoint action of the different vapor pressures produced by the volatile liquid in said receptacles for moving said device, substantially as set forth.

9. The combination of two receptacles each partially filled with a volatile liquid which produces vapor pressure at ordinary atmospheric temperatures, one of said receptacles being influenced by the dry bulb temperature of the air, means whereby the other receptacle is influenced by the wet bulb temperature of the air, motors which are actuated by the vapor pressure produced by the liquid in said receptacles, a movable device, and mechanism through which said motors act in opposition to each other on said movable device, substantially as set forth.

10. The combination of two receptacles each partially filled with a volatile liquid which produces vapor pressure at ordinary atmospheric temperatures, one of said receptacles being influenced by the dry bulb temperature of the air, means whereby the other receptacle is influenced by the wet bulb temperature of the air, a movable device, and lever operating mechanism for said movable device upon which the vapor pressures produced by the liquid in said receptacles act in opposition to each other, substantially as set forth.

11. The combination of vapor generators adapted to produce vapor pressure, one of which is influenced by the dry bulb temperature of the air, means whereby the other generator is influenced by the wet bulb temperature of the air, a movable device, and operating means for said movable device upon which the vapor pressures produced by said generators act in opposition to each other for moving said device, substantially as set forth.

12. The combination of vapor generators adapted to produce vapor pressure, one of which is influenced by the dry bulb temperature of the air, means whereby the other generator is influenced by the wet bulb temperature of the air, a movable device, an actuating lever for said device, and operating means for said lever upon which the vapor pressures produced by said generators act in opposition to each other for moving said device, substantially as set forth.

13. The combination of two receptacles each partially filled with a volatile liquid which produces vapor pressure at ordinary atmospheric temperatures, one of said receptacles being influenced by the dry bulb temperature of the air, means whereby the other generator is influenced by the wet bulb temperature of the air, a movable device, an actuating lever for said device, and operating means for said lever upon which the vapor pressures produced by the liquid in said receptacles act in opposition to each other, substantially at set forth.

14. The combination of a pressure generator, means whereby said generator is influenced by the wet bulb temperature of the air, a pressure generator which is influenced by the dry bulb temperature of the air, motors actuated by the pressures produced in said generators, a movable device, and lever mechanism which transmits the joint action of both motors to said device, substantially as set forth.

15. The combination of a pressure generator, means whereby said generator is influenced by the wet bulb temperature of the air, a pressure generator which is influenced by the dry bulb temperature of the air, a movable device, and means actuated by the joint action of the different pressures produced by said generators for moving said device, substantially as set forth.

Witness my hand, this 28th day of November, 1908.

WILLIS H. CARRIER.

Witnesses:
C. B. HORNBECK,
C. W. PARKER.

It is hereby certified that in Letters Patent No. 1,165,225, granted December 21, 1915, upon the application of Willis H. Carrier, of Buffalo, New York, for an improvement in "Psychrometers," an error appears in the printed specification requiring correction as follows: Page 2, line 25, for the word "of," first occurrence, read *by;* and that the said Letters Patent should be read with this correction therein that the same may conform to the record of the case in the Patent Office.

Signed and sealed this 25th day of January, A. D., 1916.

[SEAL.]

R. F. WHITEHEAD,
*Acting Commissioner of Patents.*

Cl. 73—24.